United States Patent [19]
Takaishi

[11] Patent Number: 6,160,676
[45] Date of Patent: Dec. 12, 2000

[54] STORAGE DISK APPARATUS AND METHOD OF CONTROLLING SAME

[75] Inventor: Kazuhiko Takaishi, Kawasaki, Japan

[73] Assignee: Fujitsu Limited, Kawasaki, Japan

[21] Appl. No.: 09/037,896

[22] Filed: Mar. 10, 1998

[30] Foreign Application Priority Data

Oct. 2, 1997 [JP] Japan ................................. 9-269921

[51] Int. Cl.⁷ ............................................. G11B 5/596
[52] U.S. Cl. .................................... 360/78.05; 360/77.07; 360/78.14; 318/593
[58] Field of Search ........................... 360/78.05, 77.02, 360/77.04, 77.05, 77.07, 77.08, 77.11, 78.12, 78.14, 78.07, 78.04; 369/32, 44.28; 318/625, 635–636, 650, 652, 590, 592, 593

[56] References Cited

U.S. PATENT DOCUMENTS

| | | | |
|---|---|---|---|
| 3,860,861 | 1/1975 | Gucker | 318/473 |
| 4,736,353 | 4/1988 | Kasai et al. | 369/32 |
| 5,090,001 | 2/1992 | Ito et al. | 369/44.28 |
| 5,268,804 | 12/1993 | Wallis | 360/78.04 |
| 5,404,255 | 4/1995 | Kobayashi et al. | 360/78.09 |
| 5,594,603 | 1/1997 | Mori et al. | 360/78.04 |
| 5,901,010 | 5/1999 | Glover et al. | 360/78.12 |
| 5,920,441 | 7/1999 | Cunnigham et al. | 360/78.05 |
| 5,978,163 | 11/1999 | Cunningham | 360/66 |
| 5,978,752 | 11/1999 | Morris | 702/186 |

*Primary Examiner*—Hoa T. Nguyen
*Assistant Examiner*—Dan I. Davidson
*Attorney, Agent, or Firm*—Greer, Burns & Crain, Ltd.

[57] ABSTRACT

A storage disk apparatus has a storage disk having servo information, a plurality of heads for reading information recorded on the storage disk, a plurality of first actuators for accurately positioning the heads with respect to the storage disk, a second actuator for coarsely positioning the heads with respect to the storage disk, and a control circuit for controlling the first actuators and the second actuator according to the servo information read by one of the heads. The control circuit supplies a drive current value depending on the servo information read by one of the heads to one of the first actuators to position the one of the heads, and also supplies the drive current value to the other first actuators to position the other heads. When one of the heads is positionally detected, all the first actuators, typically microactuators, are prevented from being vibrated and relatively displaced from the second actuator in a seek mode.

14 Claims, 11 Drawing Sheets

STORAGE DISK APPARATUS AND METHOD OF CONTROLLING SAME

BACKGROUND OF THE INVENTION

1. Field of the Invention

The present invention relates to a storage disk apparatus for positioning heads over tracks on storage disks and a method of controlling such a storage disk apparatus, and more particularly to a storage disk apparatus having a coarse actuator and microactuators combined with the coarse actuator for displacing heads through minute intervals, and a method of controlling such a storage disk apparatus.

2. Description of the Related Art

There have been demands for increased storage capacities for magnetic disk drives. To meet such demands, it is necessary to reduce the track pitch of magnetic disks. Magnetic heads for use with such magnetic disks need to be positioned accurately over tracks.

Generally, magnetic disk drives employ an actuator comprising a VCM (Voice Coil Motor) for moving magnetic heads across magnetic disks. It is difficult for the actuator which moves rapidly over several thousands to several tens of thousands of tracks on magnetic disks to be positioned over those tracks with an accuracy corresponding to one-tenth to one-ninetieth of the width of a track.

There has been proposed a magnetic disk drive having a two-stage actuator which comprises a coarse actuator in the form of a VCM and a plurality of microactuators for moving heads over minute distances, as disclosed in Japanese laid-open patent publication No. 4-205864, for example.

FIG. 11 of the accompanying drawings shows a structure of the disclosed magnetic disk drive. FIG. 12 of the accompanying drawings shows in block form the disclosed magnetic disk drive. FIG. 13 of the accompanying drawings shows an operation sequence of the disclosed magnetic disk drive.

As shown in FIG. 11, the magnetic disk drive has two magnetic disks 90 rotatable by a spindle motor 92 and an arm 95 actuatable by a VCM 96. The arm 95 supports thereon four microactuators 94-1–94-4 for actuating respective suspensions 93-1–93-4 which support respective heads 91-1–91-4 thereon. The VCM 96 and the arm 95 jointly make up a coarse actuator assembly (second actuator assembly), and the microactuators 94-1–94-4 and the suspensions 93-1–93-4 jointly make up a fine actuator assembly (first actuator assembly). A control circuit 97 positionally controls the VCM 96 and the microactuators 94-1–94-4 based on servo information from the magnetic heads 91-1–91-4.

It has been proposed to use piezoelectric devices having a resonance of a relatively high frequency as the microactuators. However, piezoelectric devices are expensive to manufacture. According to another proposal revealed in Japanese patent application No. 7-315671 (U.S. patent application Ser. No. 728079), electromagnetic microactuators are used as microactuators in magnetic disk drives. While electromagnetic microactuators are relatively inexpensive to manufacture, they have a resonance having a frequency lower than the zero-crossing frequency of open-loop characteristics of a control system therefor.

When the two-stage actuator which includes electromagnetic microactuators is controlled to move the coarse actuator assembly at a high speed in a seek mode for seeking a track on a magnetic disk, for example, the precision actuator assembly tends to be displaced relative to the coarse actuator assembly.

In FIG. 12, the microactuators 94-1–94-4 comprise electromagnetic microactuators, respectively. It is assumed that the microactuators 94-1–94-4 have a sufficiently small mass and identical mechanical characteristics. In FIG. 12, Kv represents an acceleration constant of the VCM 96, Km1–Km4 represent acceleration constants of the respective microactuators 94-1–94-4, Uma1–Uma4 represent currents supplied to the respective microactuators 94-1–94-4, and Y1–Y4 represent displacements of the respective heads 91-1–91-4.

When the VCM 96 generates an acceleration, an acceleration represented by the product of the acceleration generated by the VCM 96 and a gain Kr is applied to the microactuators 94-1–94-4. The microactuators 94-1–94-4 which are not positionally controlled undergo a large relative displacement with respect to the coarse actuator assembly. This phenomenon manifests itself particularly when electromagnetic microactuators having a low-frequency primary resource are employed.

The above phenomenon poses a problem when switching to another head immediately after the seek mode. Specifically, after a certain head has been positioned over a certain track in the seek mode, when the head switches to another head, the microactuator of the other head is vibrated due to the acceleration caused in the seek mode, and undergoes a large relative displacement with respect to the coarse actuator assembly. Consequently, a certain period of time is needed to stabilize the vibration and the relative displacement.

According to the disclosure of Japanese laidopen patent publication No. 4-205864, the above problem is solved by positionally controlling the microactuators based on positional signals (servo signals) detected by the respective heads.

Such a control process with N microactuators will be described below with reference to FIG. 13. Successive steps of the control process are represented by numerals with a prefix S.

(S1) A pointer i is initialized to "1" for each sample.

(S2) Control checks whether or not the pointer i is equal to or greater than "N+1".

(S3) If the pointer i is not equal to or greater than "N+1", then the position of the ith head is read from the servo signal, and a drive current value for the ith microactuator is calculated.

(S4) The ith microactuator is energized with the calculated drive current value. Then, the pointer i is updated to "i+1", and control returns to the step S2.

(S5) If the pointer i is equal to or greater than "N+1", then a drive current value for the coarse actuator assembly is calculated, using the position of the head to be controlled. Thereafter, the coarse actuator assembly is energized, after which the operation sequence comes to an end.

Heretofore, as described above, the servo signal of each of the heads is read for each sample, and the position of each of the heads is detected from the servo signal. Then, a drive current value for each of the microactuators is calculated, and each of the microactuators is energized. In this manner, each of the microactuators is prevented from being vibrated and relatively displaced in the seek mode.

However, the conventional control process has been disadvantageous for the following reasons:

According to an embeded servo system, only one position detecting circuit is employed. One of a plurality of heads is selected, and a positional signal read by the selected head is supplied to the position detecting circuit. According to the conventional magnetic disk drive, however, as many position detecting circuits as the number of microactuators are required to detect the positions of the respective microactuators. Therefore, the conventional magnetic disk drive is expensive to manufacture.

Furthermore, drive current values for all the microactuators need to be calculated for each sample. Consequently, the conventional magnetic disk drive requires a high-speed processor, and hence is expensive to manufacture.

SUMMARY OF THE INVENTION

It is an object of the present invention to provide a storage disk apparatus which is capable of preventing each microactuator from being vibrated and relatively displaced in a seek mode with a single position detecting circuit, and a method of controlling such a storage disk apparatus.

Another object of the present invention is to provide a storage disk apparatus which is capable of preventing each microactuator from being vibrated and relatively displaced in a seek mode without calculating drive current values for other microactuators, and a method of controlling such a storage disk apparatus.

Still another object of the present invention is to provide a relatively inexpensive storage disk apparatus which is capable of preventing each microactuator from being vibrated and relatively displaced in a seek mode, and a method of controlling such a storage disk apparatus.

According to the present invention, there is provided a storage disk apparatus comprising at least one storage disk having servo information, a plurality of heads for reading information recorded on the storage disk, a plurality of first actuators for accurately positioning the heads with respect to the storage disk, the heads being supported on the first actuators, a second actuator for coarsely positioning the heads with respect to the storage disk, the first actuators being supported on the second actuator, and control means for controlling the first actuators and the second actuator according to the servo information read by one of the heads.

The control means supplies a drive current value depending on the servo information read by one of the heads to one of the first actuators to position the one of the heads, and also supplies the drive current value to the other first actuators to position the other heads.

The first actuator which is to be positioned is controlled such that its relative position with respect to the second actuator becomes zero in a DC manner. In either a seek mode or a track following mode, the first actuator is prevented from being largely displaced with respect to the second actuator.

The drive current value supplied to the first actuator used for positional control is supplied to the other first actuators to operate the other first actuators in the same manner as the first actuator used for positional control. Therefore, the other first actuators are prevented from being vibrated, and also from being relatively displaced from the second actuator.

Since only one of the first actuators is to be positionally controlled, the storage disk drive requires only one position detecting circuit, and a drive current value needs to be calculated only once for each sample. Therefore, the storage disk drive is relatively inexpensive to manufacture, and yet is capable of preventing the first actuators from being vibrated and relatively displaced with respect to the second actuator.

Other features and advantages of the present invention will become readily apparent from the following description when taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
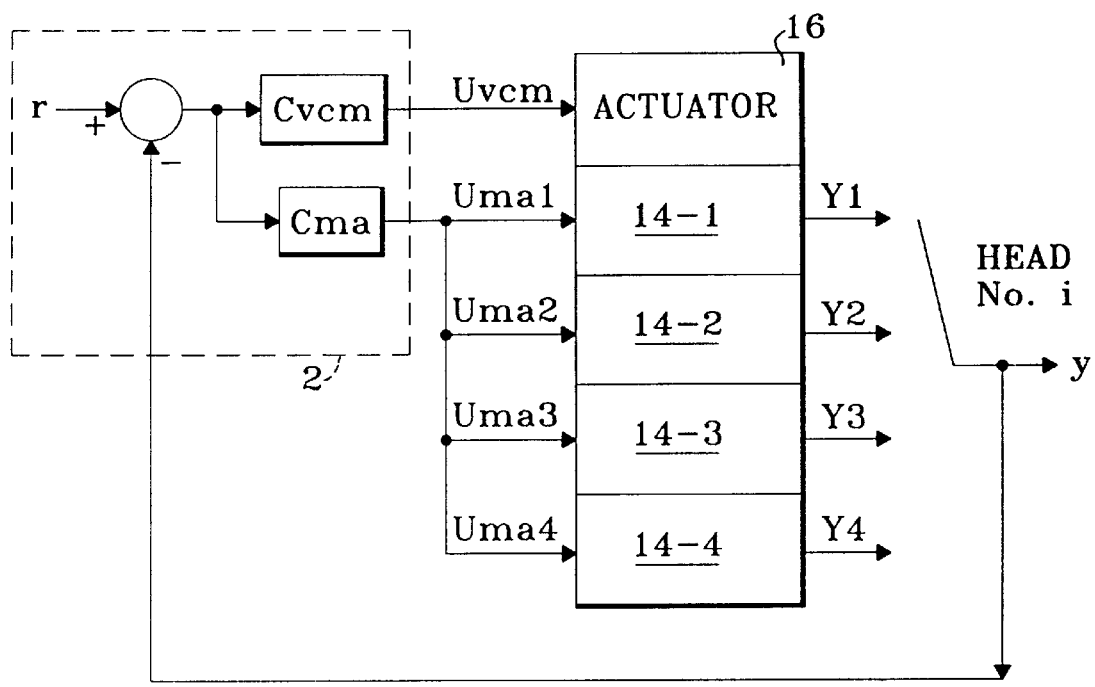
FIG. 1 is a block diagram showing the principles of the present invention.

FIG. 1 shows a block diagram of the principles of the present invention.

According to the present invention, a storage magnetic disk drive comprises a plurality of storage disks having servo information and a plurality of heads for reading information of the storage disk. The heads are supported by a plurality of first actuators 14-1–14-4 which accurately position the heads. The first actuators 14-1–14-4 are supported by a second actuator 16 which coarsely positions the heads. The first actuators 14-1–14-4 and the second actuator 16 are controlled by a control circuit 2 based on servo information read from the disks by one of the heads.

The control circuit 2 supplies a drive current value depending on the servo information read by the head to one first actuator 14-1 which positions one of the heads. The control circuit 2 also supplies the same drive current value to the other first actuators 14-2–14-4 which position the other heads.

The first actuator 14-1 to be positioned is positionally controlled such that its relative position with respect to the second actuator 16 becomes zero in a DC manner. In either a seek mode or a track following mode, the first actuator 14-1 is prevented from being largely displaced with respect to the second actuator 16.

The drive current value used to positionally control the first actuator 14-1 is supplied to the other first actuators 14-2–14-4, so that the other first actuators 14-2–14-4 operate in the same manner as the positionally controlled first actuator 14-1. Therefore, the other first actuators 14-2–14-4 are prevented from being vibrated, and also from being relatively displaced from the second actuator 16.

Since only one of the first actuators is positionally controlled, only one position detecting circuit is required, and a drive current value is calculated only once for each sample. Therefore, the storage magnetic disk drive according to the present invention is relatively inexpensive to manufacture, and yet is capable of preventing the first actuators from being vibrated and relatively displaced with respect to the second actuator in a seek mode.

FIGS. 2 through 5 show a magnetic disk drive according to a first embodiment of the present invention.

Figure 2:
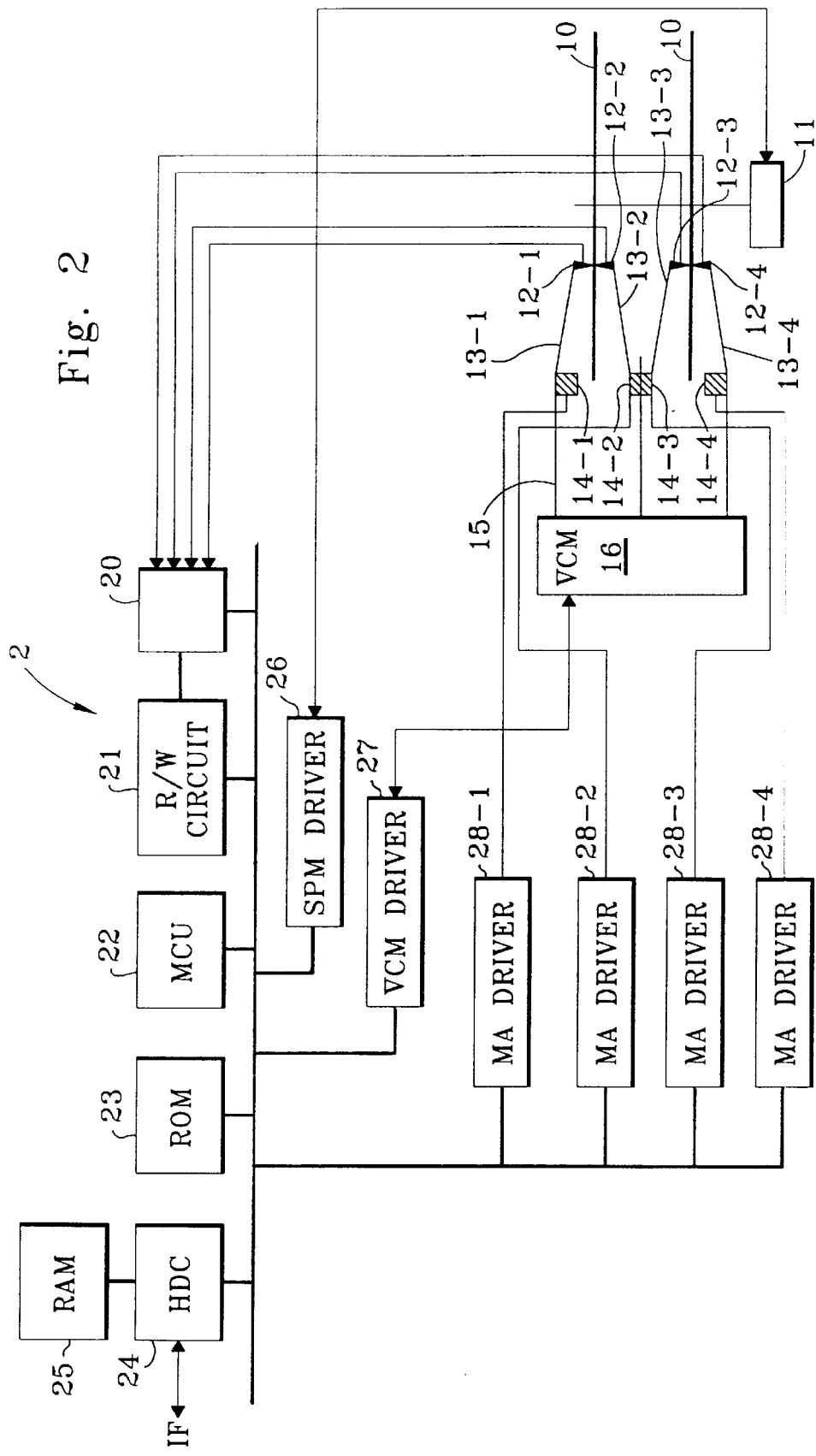
FIG. 2 is a block diagram of a magnetic disk drive according to a first embodiment of the present invention.
Figure 3:
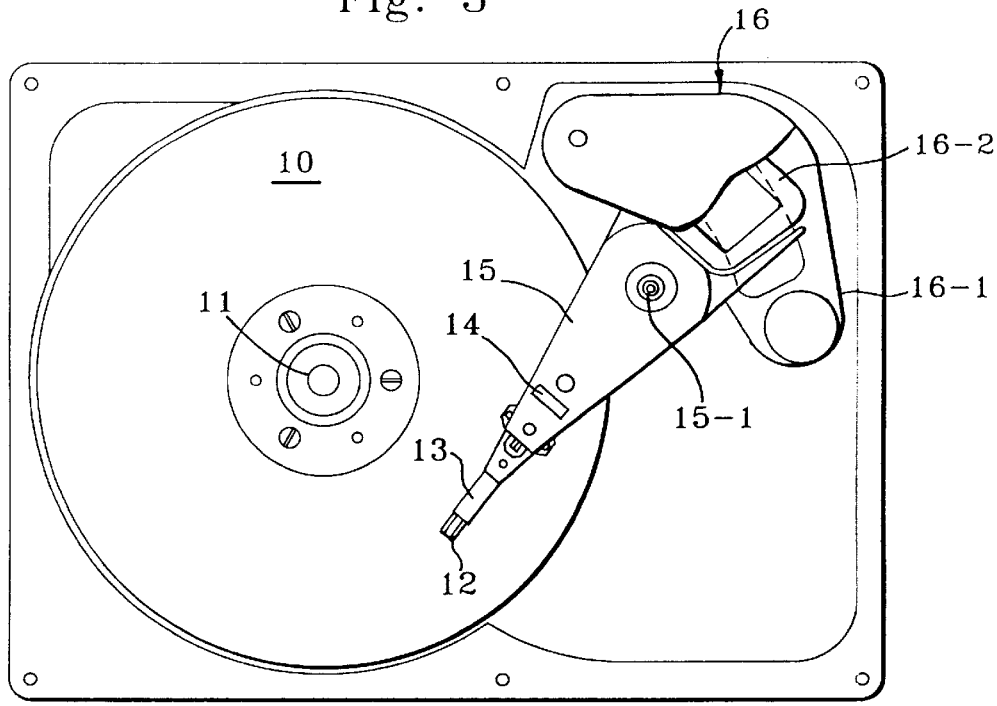
FIG. 3 is a plan view of the magnetic disk drive shown in FIG. 2.

As shown in FIGS. 2 and 3, the magnetic disk drive comprises a plurality of magnetic disks 10 and a spindle motor 11 coupled to the magnetic disks 10 for rotating the magnetic disks 10 about their central axes.

Each of the tracks on each of the magnetic disks 10 includes a servo area recorded with servo information and a data area for storing data. The magnetic disk drive has an arm 15 connected to and actuatable by a VCM 16. As shown in FIG. 3, the VCM 16 comprises a VCM coil 16-2 and a magnet 16-1.

The arm 15, which is angularly movable about a shaft 15-1, supports four microactuators 14 (14-1–14-4) for actuating respective suspensions 13 (13-1–13-4) which support respective heads 12 (12-1–12-4) thereon.

Figure 4:
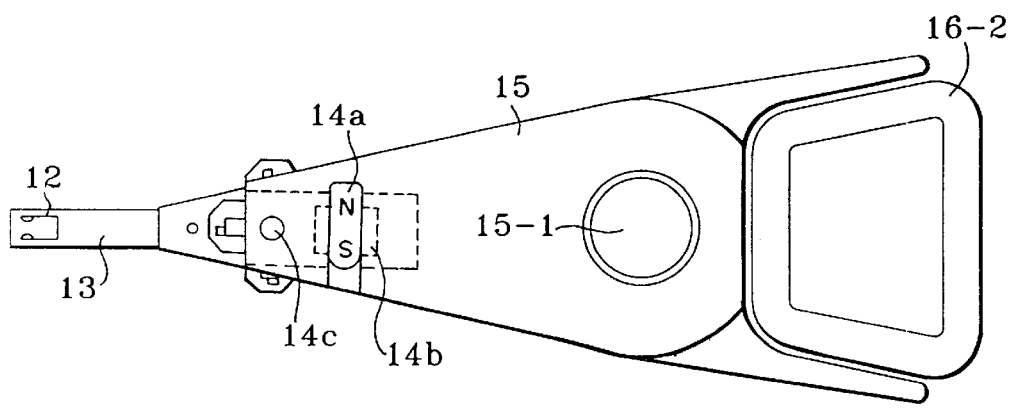
FIG. 4 is a plan view of an actuator of the magnetic disk drive shown in FIG. 2.

As shown in FIG. 4, the suspensions 13 are movably supported on the arm 15 by shafts 14c. The microactuators 14 have respective magnets 14a mounted on the arm 15 and respective coils 14b mounted respectively on the suspensions 13.

Therefore, an actuator for actuating the heads 12-1–12-4 comprises a coarse actuator (second actuator) composed of the VCM 16 and the arm 15 and a precision actuator assembly (first actuator assembly) composed of the microactuators 14-1–14-4 and the suspensions 13-1–13-4. The microactuators 14-1–14-4 comprise respective electromagnetic microactuators which have a low-frequency primary resonance.

As shown in FIG. 2, a selector 20 selects one of the signals read by the magnetic heads 12-1–12-4. A read/write circuit 21 demodulates read signals from the signals supplied from the magnetic heads 12-1–12-4, and supplies write signals to the magnetic heads 12-1–12-4. The read/write circuit 21 has a position detecting circuit for detecting the position of a magnetic head based on servo information from the magnetic head. Only one position detecting circuit is employed because the magnetic disk drive incorporates a data surface servo system.

A microcontroller (MCU) 22 comprises a processor for controlling the actuators as described later on. A read-only memory (ROM) 23 stores a program to be run by the MCU 22. A hard disk controller (HDC) 24 interfaces with a host device. A random-access memory (RAM) 25 stores data to be supplied to the host device and data supplied from the host device.

A spindle motor driver 26 energizes the spindle motor 11 based on instructions from the MCU 22. A VCM driver 27 energizes the VCM 16 based on instructions from the MCU 22.

Microactuator drivers 28-1–28-4 energize respective microactuators 14-1–14-4 based on instructions from the MCU 22. Each of the microactuator drivers 28-1–28-4 comprises a D/A converter and an amplifier.

Figure 5:
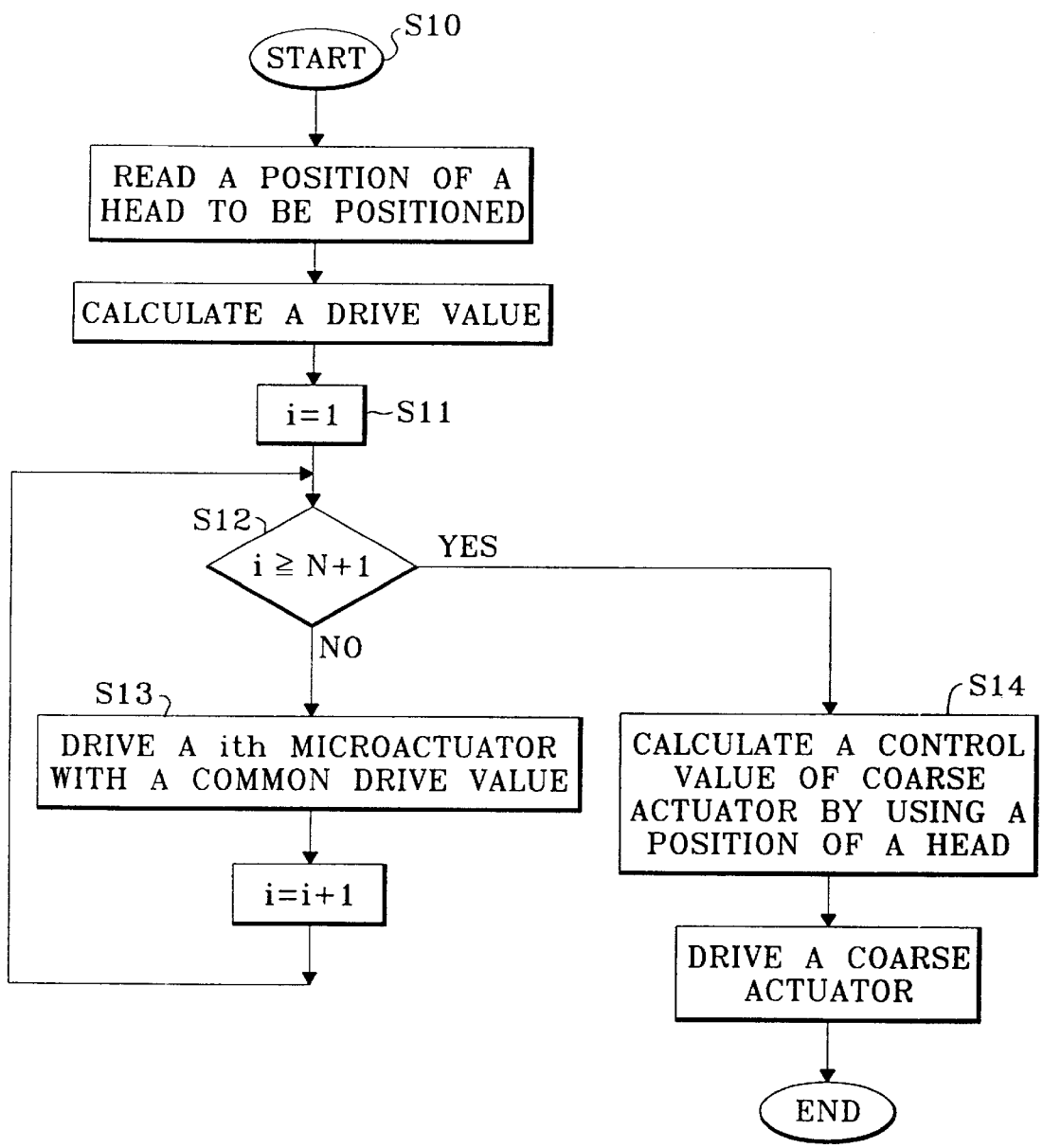
FIG. 5 is a flowchart of an operation sequence of the magnetic disk drive shown in FIG. 2.

Operation of the magnetic disk drive according to the first embodiment will be described below with reference to FIG. 5. It is assumed that there are N microactuators (N≧2). Successive steps of the control process are represented by numerals with a prefix S.

(S10) For each sample, the MCU 22 reads the position of the magnetic head to be positionally controlled from the position detecting circuit of the read/write circuit 21. Since the selector 20 selects the magnetic head to be positionally controlled, the position detecting circuit of the read/write circuit 21 detects the position of the magnetic head from the servo information which has been read by the magnetic head. Based on the position of the magnetic head, the MCU 22 calculates a drive current value for the microactuators 14-1–14-4 with respect to the head.

(S11) The MCU 22 initializes a pointer i to (S12) The MCU 22 checks whether or not the pointer i is equal to or greater than "N+1".

(S13) If the pointer i is not equal to or greater than "N+1", then the MCU 22 supplies the calculated drive current value to the ith microactuator driver to energize the ith microactuator with the drive current value. The MCU 22 updates the pointer i to "i+1", and control returns to the step S12.

(S14) If the pointer i is equal to or greater than "N+1", then the MCU 22 calculates a drive current value for the coarse actuator 16 using the position of the magnetic head to be positionally controlled. Then, the MCU 22 supplies the calculated drive current value to the VCM driver 27 to energize the VCM 16, after which control ends.

As described above, the MCU 22 detects the position of the magnetic head to be positionally controlled, calculates a drive current value for the microactuators, and energizes the microactuators with the calculated drive current value.

Specifically, the microactuator 14-1 to be positionally controlled is controlled such that its relative position with respect to the second actuator 16 becomes zero in a DC manner. In either a seek mode or a track following mode, the first actuator 14-1 is prevented from being largely displaced with respect to the second actuator 16.

When the drive current value used to positionally control the first actuator 14-1 is supplied to the other first actuators 14-2–14-4, the other first actuators 14-2–14-4 operate in the same manner as the positionally controlled first actuator 14-1. Therefore, the other first actuators 14-2–14-4 are prevented from being vibrated, and also from being relatively displaced from the second actuator 16.

Inasmuch as only one of the first actuators is positionally controlled, only one position detecting circuit is required, and a drive current value is calculated only once for each sample. Therefore, the storage magnetic disk drive according to the present invention is relatively inexpensive to manufacture, and yet is capable of preventing the first actuators from being vibrated and relatively displaced with respect to the second actuator in the seek mode.

Even though the electromagnetic microactuators which have a low-frequency primary resonance and are apt to be vibrated are employed, they are prevented from being vibrated in the seek mode.

In the first embodiment, one microactuator is associated with one magnetic head. However, one microactuator may be associated with two magnetic heads.

The microactuators are more affected by the operation of the coarse actuator assembly in the seek mode than while a magnetic head is following a target track. Therefore, the microactuators may be energized with a common drive current value only in the seek mode.

Furthermore, in a short-distance seek mode for moving a magnetic head over a short distance, i.e., across one or two tracks, the acceleration of the coarse actuator assembly is not so large. The microactuators are considered not to be affected by the operation of the coarse actuator assembly in the short-distance seek mode. In the short-distance seek mode, therefore, the other first microactuators may not be energized with the common drive current value.

Figure 6:
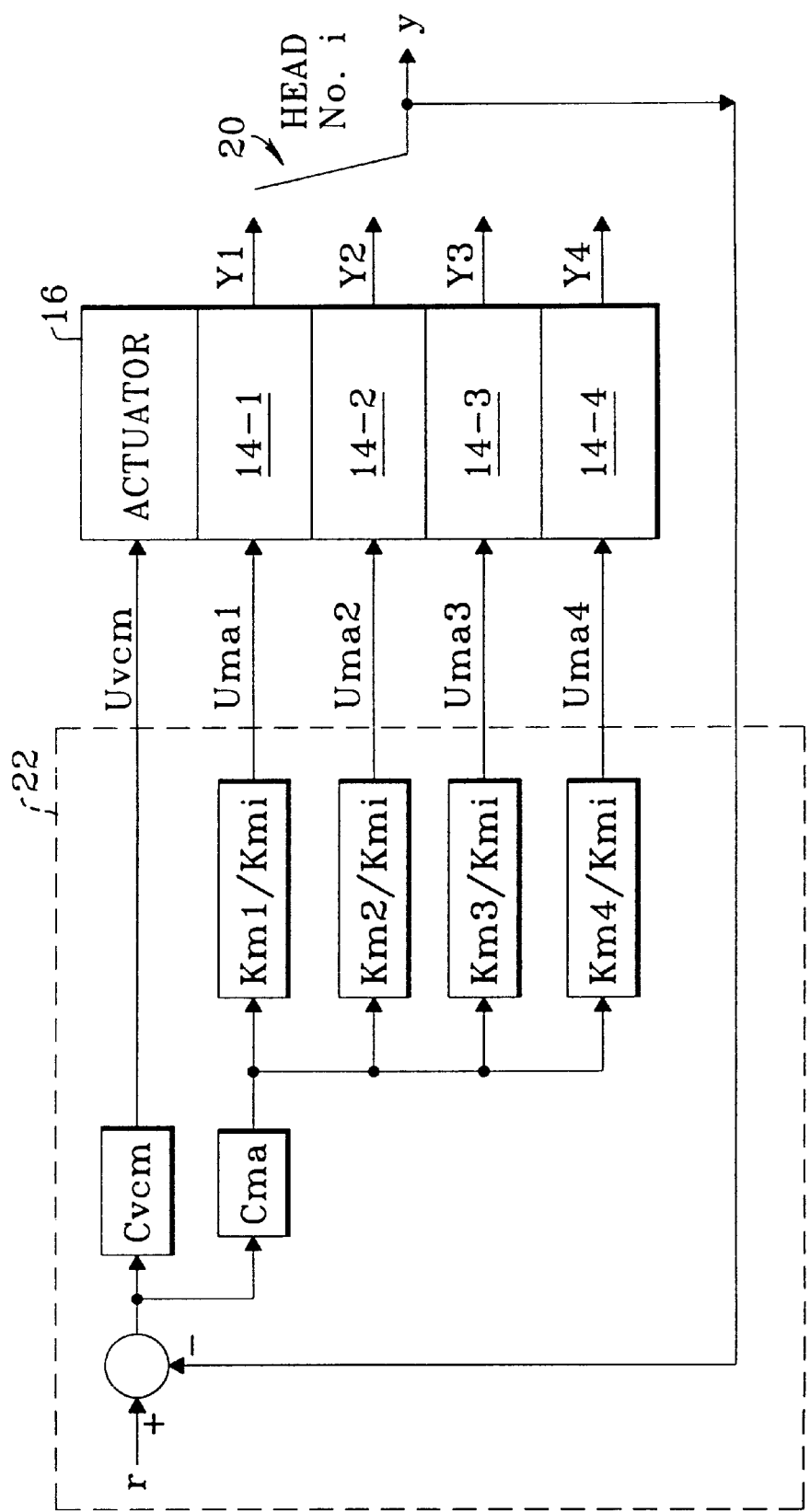
FIG. 6 is a block diagram of a magnetic disk drive according to a second embodiment of the present invention.

FIG. 6 shows a block diagram of a magnetic disk drive according to a second embodiment of the present invention.

Different microactuators have respective gains which differ due to their individual characteristics. Therefore, even when the microactuators are supplied with a common drive current value, they tend to generate different displacements or accelerations. If, however, the differences between the gains of the microactuators of one magnetic disk drive are small, then all the microactuators may be supplied with a common drive current value.

If, on the other hand, the differences between the gains of the microactuators are not negligibly small, then they generate different displacements or accelerations when supplied with a common drive current value. The magnetic disk drive according to the second embodiment is arranged to eliminate such a drawback. According to the second embodiment, as shown in FIG. 6, an absolute value Kmi and relative values Km1/Kmi–Km4/Kmi of the gains of the microactuators 14-1–14-4 are measured in advance. The MCU 22 calculates drive current values depending on gain ratios Km1/Kmi–Km4/Kmi, and supplies the calculated drive current values to the microactuators 14-1–14-4. The gain ratios are varied depending on the microactuators i which are controlled.

Figure 7:
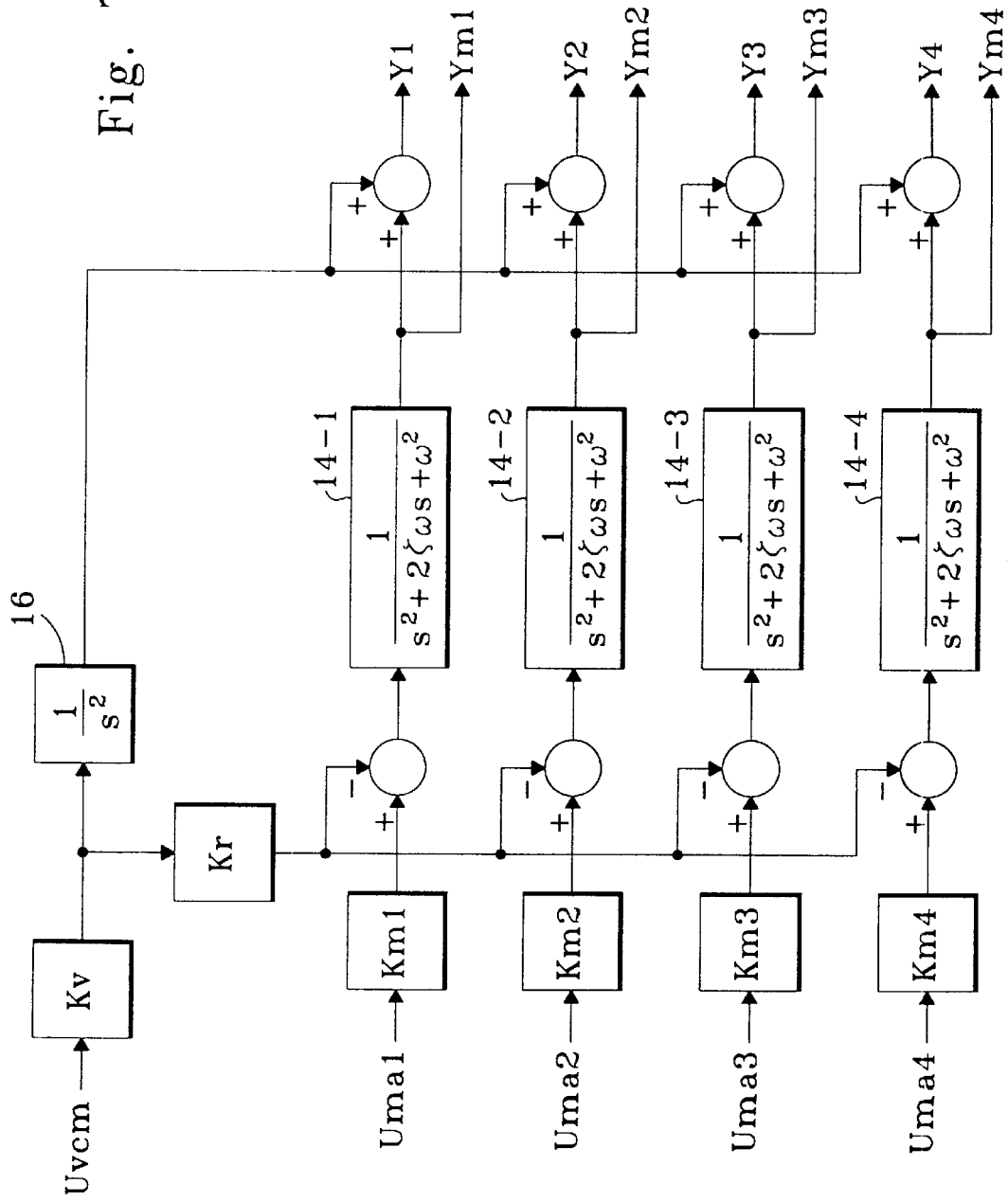
FIG. 7 is a block diagram of an actuator of a magnetic disk drive according to a third embodiment of the present invention.
Figure 8:
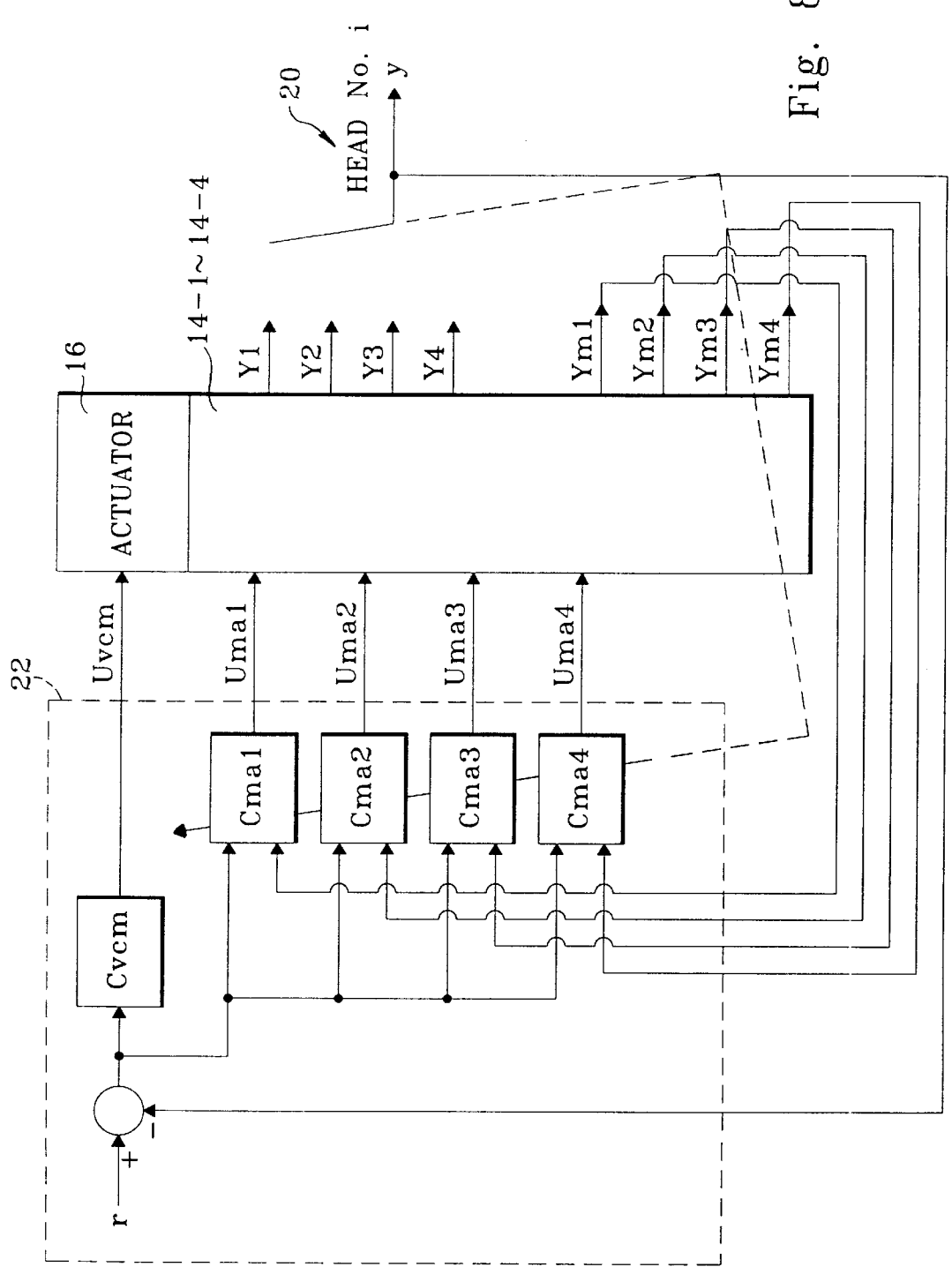
FIG. 8 is a block diagram of a control system of the magnetic disk drive according to the third embodiment of the present invention.

FIGS. 7 and 8 show block diagrams of an actuator and a control system, respectively, a magnetic disk drive according to a third embodiment of the present invention.

According to the third embodiment, displacements of respective microactuators are detected. For example, positions, speeds, or accelerations of the microactuators are detected on the basis of changes in voltages or capacitances between the terminals of the microactuators. Alternatively, the microactuators are associated with respective displacement sensors, speed sensors, or acceleration sensors.

As shown in FIG. 7, displacements Ym1–Ym4 of the respective microactuators 14-1–14-4 are detected in the manner described above, and the microactuators 14-1–14-4 are controlled such that their displacements from the coarse actuator assembly will become zero based on the detected displacements Ym1–Ym4.

As shown in FIG. 8, the MCU 22 is supplied with the position of the head to be positionally controlled and the detected displacements Ym1–Ym4 of the microactuators 14-1–14-4. The MCU 22 controls only the microactuator of the head to be positionally controlled to reach a target position. The MCU 22 controls the remaining microactuators with the detected displacements such that their displacements from the coarse actuator assembly will become zero.

In this embodiment, while it is necessary to calculate drive current values for the respective microactuators, the microactuators can individually be controlled. The arrangement for detecting displacements of the respective microactuators may be simpler than the conventional arrangement which relies upon servo information.

Figure 9:
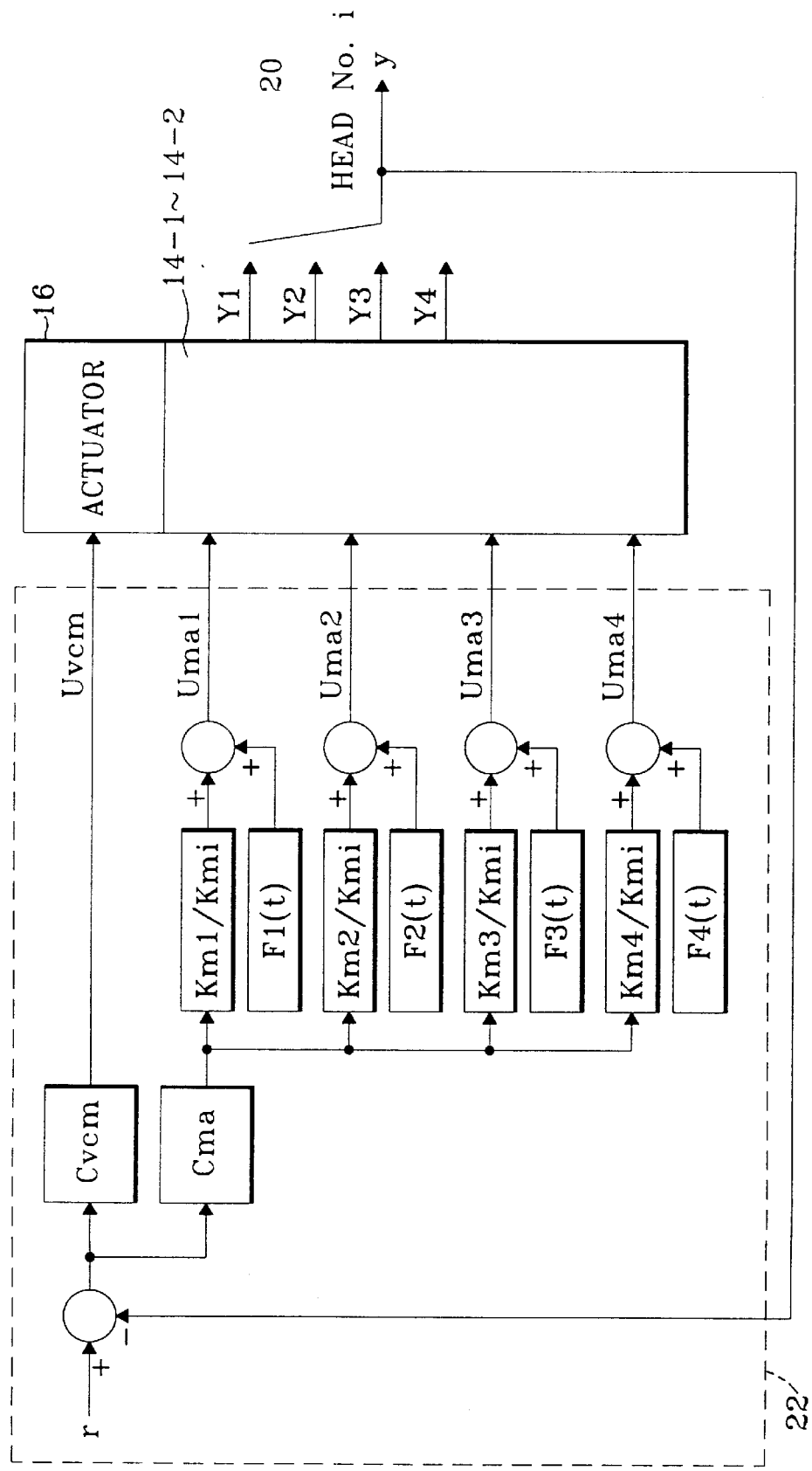
FIG. 9 is a block diagram of a magnetic disk drive according to a fourth embodiment of the present invention.

FIG. 9 shows in block form a magnetic disk drive according to a fourth embodiment of the present invention.

The tracks to be followed by the respective heads may not necessarily have the same off-center fluctuations. If track widths are small and fluctuations which motors for recording positioning information on magnetic disks suffer or which magnetic disks suffer when positioning information is recorded thereon are not negligible, then the tracks undergo such off-center fluctuations.

Magnetic disk drives with a plurality of microactuators need to wait until a magnetic head follows a desired track if such a magnetic head cannot immediately follow off-center track fluctuations upon switching from another magnetic head.

According to the fourth embodiment shown in FIG. 9, each magnetic head is controlled for its own off-center fluctuation correction. As shown in FIG. 9, electromagnetic microactuators 14-1–14-4 are supplied with respective different off-center fluctuation correcting currents F1(t)–F4(t).

Specifically, the microactuator 14-1 for actuating a magnetic head to be positionally controlled is supplied with an off-center fluctuation correcting current F1(t), and the other microactuators 14-2–14-4 are also supplied with off-center fluctuation correcting currents F2(t)–F4(t).

The off-center fluctuation correcting currents F1(t)–F4(t) have a waveform such as that of a sine wave. Those magnetic heads which are not used for positional control, i.e., those magnetic heads whose positions are not detected, can substantially follow the paths of off-center track fluctuations. Therefore, the offset of any magnetic head from a target position can be held at a substantially constant level upon switching from another magnetic head at any time.

If each arm is associated with a microactuator, two magnetic heads may be mounted on one arm. Therefore, two magnetic heads may be controlled by a single microactuator. However, the waveforms of off-center fluctuation correcting currents for such two magnetic heads differ from each other.

In such a case, while one of the two magnetic heads is being used for positional control, an off-center fluctuation correcting current with respect to that magnetic head is supplied to the microactuator of the other magnetic head. If both of the two magnetic heads are not used for positional control, then an average value of off-center fluctuation correcting currents for the magnetic heads is supplied to the magnetic heads.

With this arrangement, any positional displacement of a magnetic head upon switching from another magnetic head is held to a minimum.

If the movable range of a microactuator is small, then the microactuator may not be able to follow an eccentricity of the magnetic disk when the eccentricity of the magnetic disk is large, especially when the magnetic disk suffers a large central axis error or when the magnetic disk is installed in the magnetic disk drive after servo information is recorded on the magnetic disk in another location. In such a situation, the microactuators themselves are unable to follow the eccentricity of the magnetic disk.

The microactuators cannot follow fluctuations whose frequencies are as large as rotational frequencies because such fluctuations have a large amplitude. However, the microactuators can follow fluctuations whose frequencies are at least twice rotational frequencies because such fluctuations have a small amplitude.

Consequently, the microactuators of the magnetic disk drive shown in FIG. 9 are controlled for off-center fluctuation correction with respect to off-center fluctuations whose frequencies are at least twice rotational frequencies. The magnetic heads are controlled to follow fluctuations whose frequencies are as large as rotational frequencies, using the coarse actuator assembly.

Figure 10:
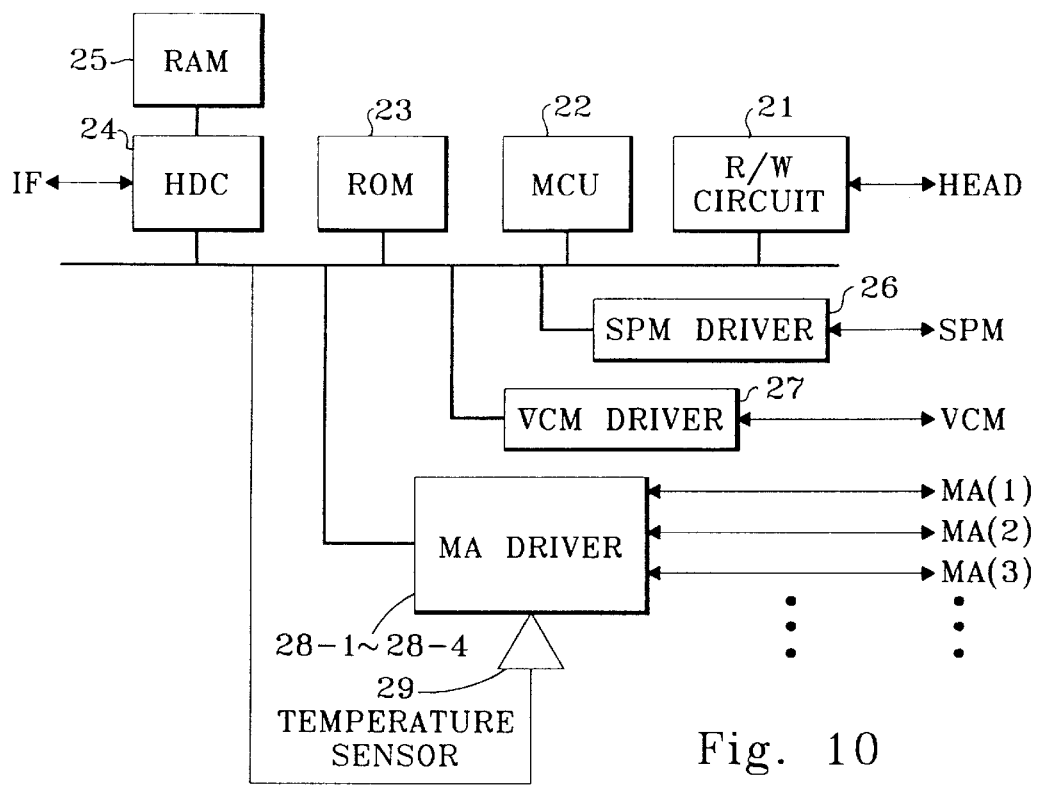
FIG. 10 is a block diagram of a magnetic disk drive according to a fifth embodiment of the present invention.
Figure 11:
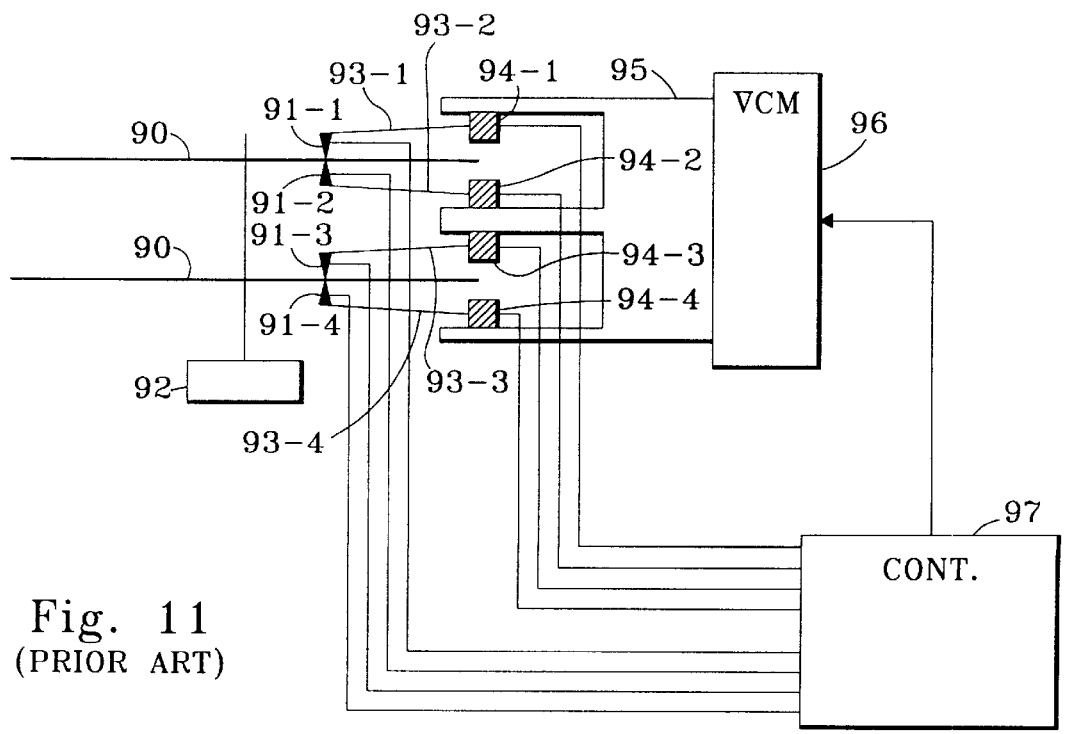
FIG. 11 is a view showing a structure of a conventional magnetic disk drive.
Figure 12:
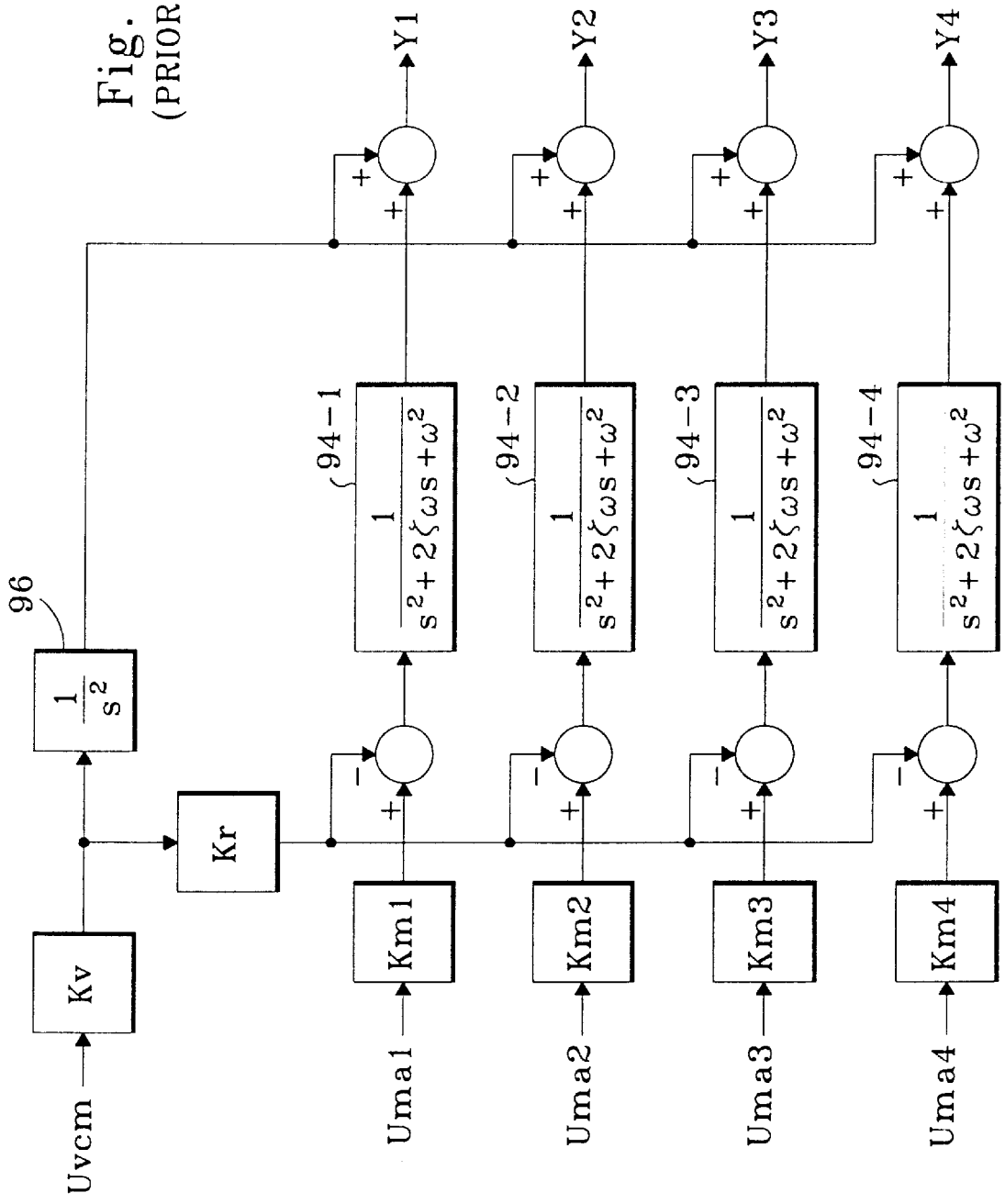
FIG. 12 is a block diagram of the conventional magnetic disk drive.
Figure 13:
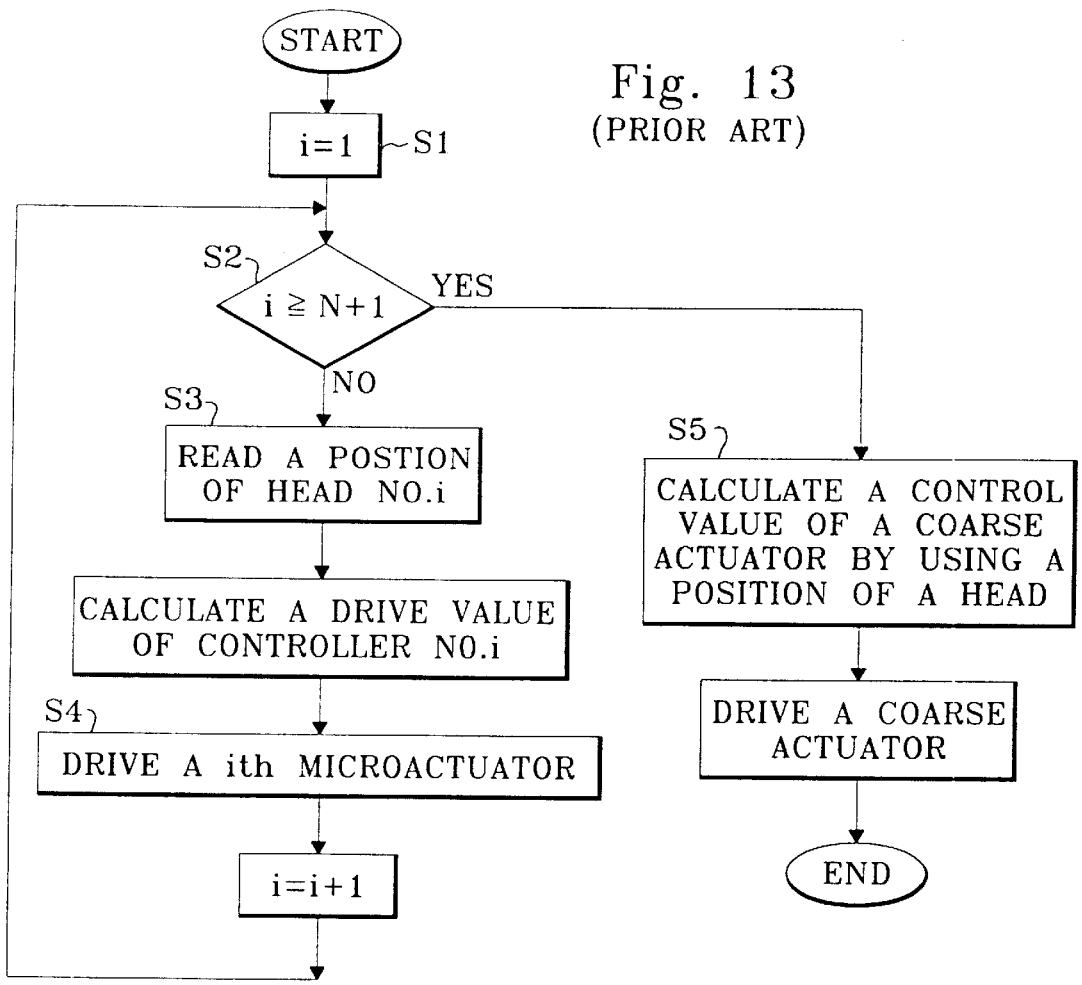
FIG. 13 is a flowchart of an operation sequence of the conventional magnetic disk drive.

FIG. 10 shows in block form a magnetic disk drive according to a fifth embodiment of the present invention. Those parts of the magnetic disk drive shown in FIG. 10 which are identical to those shown in FIG. 2 are denoted by identical reference numerals, and will not be described in detail below.

Microactuator drivers 28-1–28-4 are associated with a temperature sensor 29. When a plurality of microactuators are energized by the microactuator drivers 28-1–28-4 at the same time, since they consume a large amount of electric energy together, the microactuators and the microactuator drivers 28-1–28-4 generate heat.

The temperature of the microactuator drivers 28-1–28-4 is detected by the temperature sensor 29. When the detected temperature is higher than a predetermined value, the MCU 22 stops controlling the microactuators and waits until the detected temperature drops below the predetermined value.

The temperature sensor 29 may be incorporated in the microactuator drivers 28-1–28-4 or encased in an IC of the microactuator drivers 28-1–28-4. The MCU 22 may periodically read the detected temperature, or may read the detected temperature upon an interrupt from the temperature sensor 29 when the detected temperature becomes higher than the predetermined value.

The present invention may be modified as follows:

(1) The principles of the present invention may be applied to other storage disk drives than the magnetic disk drives.

(2) The microactuators may be of other structures than those illustrated.

The present invention offers the following advantages:

(1) Since microactuators which are not positionally controlled are supplied with a drive current value for a microactuator which is being positionally controlled, all the microactuators are prevented from being vibrated and relatively displaced from the coarse actuator assembly, using a single position detecting circuit.

(2) Inasmuch as a position is detected and a drive current value is calculated only once for each sample, the magnetic disk drive requires no high-speed controller. Therefore, the magnetic disk drive, which is capable of preventing the microactuators from being vibrated and relatively displaced from the coarse actuator assembly, may be relatively inexpensive to manufacture.

Although certain preferred embodiments of the present invention have been shown and described in detail, it should be understood that various changes and modifications may be made therein without departing from the scope of the appended claims.

What is claimed is:

1. A storage disk apparatus comprising:

a plurality of heads for at least reading information recorded on storage disks having servo information:

a plurality of first actuators for accurately positioning said heads with respect to said storage disks, said heads being supported on said first actuators;

a second actuator for coarsely positioning said heads with respect to said storage disks, said first actuators being supported on said second actuator; and control means for controlling said first actuators and said second actuator according to servo information read by one of said heads;

wherein said control means drive one of said first actuators to position said one of said heads with a first drive current value depending on said servo information read by said one of said heads, and drive at least one of the other said first actuators to position at least one of the other said heads with a second drive current value depending on said servo information read by said one of said heads.

2. A storage disk apparatus according to claim 1, wherein said second drive current value is proportional to said first drive current value, and a gain ratio between said one of said first actuators and said at least one of the other said first actuators is a proportionality constant.

3. A storage disk apparatus according to claim 1, wherein said control means drive said at least one of the other said first actuators with said second drive current value when said second actuator is controlled in a seek mode for seeking a track on said storage disks.

4. A storage disk apparatus according to claim 3, wherein said control means drive said at least one of the other said first actuators with said second drive current value during a long-distance seek and stop driving said at least one of the other said first actuators with said second drive current value during a short-distance seek mode for seeking a track over a short distance relative to a distance covered by said long-distance seek on said storage disks.

5. A storage disk apparatus according to claim 1, wherein said control means drive said one of said first actuators with a third drive current value which is the sum of said first drive current value and a current value for correcting an off-center fluctuation of said storage disks, and said at least one of the other said first actuators with a fourth drive current value which is the sum of said second drive current value and said current value for correcting said off-center fluctuation.

6. A storage disk apparatus according to claim 1, further comprising temperature detecting means for detecting a temperature of said first actuators, wherein said control means stop driving of said first actuators when the temperature detected by said temperature detecting means is higher than a predetermined temperature.

7. A storage disk apparatus according to claim 1, wherein said storage disks comprises magnetic disks, and said heads comprise magnetic heads.

8. A storage disk apparatus according to claim 1, wherein said first actuators comprise actuators having a low-frequency resonance.

9. A method of controlling a storage disk apparatus having a plurality of heads for at least reading information recorded on storage disks having servo information, a plurality of first actuators for accurately positioning said heads with respect to said storage disks, said heads being supported on said first actuators, a second actuator for coarsely positioning said heads with respect to said storage disks, said first actuators being supported on said second actuator; and control means for controlling said first actuators and said second actuator according to servo information read by one of said heads, said method comprising the steps of:

calculating a first drive current value depending on said servo information read by said one of said heads and a second drive current value depending on said servo information read by said one of said heads; and supplying said first drive current value to one of said first actuators to position said one of said heads and a second drive current value to at least one of the other said first actuators to position at least one of the other said heads.

10. A storage disk apparatus according to claim 9, wherein said second drive current value is proportional to said first drive current value, and a gain ratio between said one of said first actuators and said at least one of the other said first actuators is a proportionality constant.

11. A method according to claim 9, wherein said step of supplying comprises the step of supplying said second drive current value to said at least one of the other said first actuators when said second actuator is controlled in a seek mode for seeking a track on said storage disks.

12. A method according to claim 9, wherein said step of supplying includes the steps of driving said at least one of the other said first actuators with said second drive current value during a long-distance seek and stopping to dive said at least one of the other said first actuators with said second drive current value during a short-distance seek mode for seeking a track over a short distance relative to a distance covered by said long-distance seek on said storage disks.

13. A method according to claim 9, wherein said step of supplying comprises the step of driving said one of said first actuators with a third drive current value which is the sum of said first drive current value and a current value for correcting an off-center fluctuation of said storage disks, and said at least one of the other said first actuators with a fourth drive current value which is the sum of said second drive current value and said current value for correcting an off-center fluctuation.

14. A method according to claim 9, further comprising the step of:

stopping to drive of said first actuators when a detected temperature of said first actuators is higher than a predetermined temperature.

* * * * *